United States Patent [19]
Bolken et al.

[11] Patent Number: 5,925,384
[45] Date of Patent: Jul. 20, 1999

[54] MANUAL PELLET LOADER FOR BOSCHMAN AUTOMOLDS

[75] Inventors: Todd O. Bolken, Meridian; Mark S. Johnson, Boise, both of Id.

[73] Assignee: Micron Technology, Inc., Boise, Id.

[21] Appl. No.: 08/845,603

[22] Filed: Apr. 25, 1997

[51] Int. Cl.[6] .......................... B29C 31/04; B29C 45/02
[52] U.S. Cl. .................... 425/116; 425/120; 425/256; 425/257; 425/544; 425/588; 264/272.17
[58] Field of Search .................... 425/120, 116, 425/544, 256, 257, 588; 221/264; 414/403; 264/272.17

[56] References Cited

U.S. PATENT DOCUMENTS

| | | | |
|---|---|---|---|
| 2,866,561 | 12/1958 | Groves | 221/264 |
| 3,040,378 | 6/1962 | Rodgers, Jr. et al. | 425/544 |
| 3,071,814 | 1/1963 | Guggenheim | 425/544 |
| 3,473,196 | 10/1969 | Hull et al. | 425/544 |
| 4,653,993 | 3/1987 | Boschman | 425/116 |
| 4,834,264 | 5/1989 | Siegel et al. | 221/264 |
| 4,997,355 | 3/1991 | Yamauchi et al. | 264/272.17 |
| 5,080,552 | 1/1992 | Takahashi et al. | 414/403 |
| 5,158,780 | 10/1992 | Schraven et al. | 425/116 |
| 5,252,053 | 10/1993 | Schraven et al. | 425/127 |
| 5,297,897 | 3/1994 | Venrooij et al. | 425/544 |
| 5,366,368 | 11/1994 | Jang | 425/544 |
| 5,411,170 | 5/1995 | Boschman | 221/167 |
| 5,656,305 | 8/1997 | Venrooij | 425/544 |
| 5,698,152 | 12/1997 | Taruno et al. | 264/272.11 |
| 5,770,128 | 6/1998 | Kobayashi et al. | 264/272.17 |
| 5,804,126 | 9/1998 | Karunaratne et al. | 264/328.5 |

FOREIGN PATENT DOCUMENTS

| | | | |
|---|---|---|---|
| 1524954 | 9/1978 | United Kingdom | 425/256 |

OTHER PUBLICATIONS

"Ch. 3 System Description and Ch. 6 Operation Guide", In: *Packstar Series: Manual Multiplunger Molding Systems, Packstar 420,* Boschman Technologies, (1994).

"Drawings", In: *Packstar Series: Manual Multiplunger Molding Systems, Packstar 420,* Boschman Technologies, 3,4, 6–12, (1994).

*Primary Examiner*—Robert Davis
*Attorney, Agent, or Firm*—Schwegman, Lundberg, Woessner & Kluth P.A.

[57] ABSTRACT

A manual loader for use in bypassing an automatic pellet feeder for an automold machine used to encapsulate integrated circuit assemblies in plastic. The loader has a support mounted adjacent the mold section of the machine. The loader also has at least one pellet boat which moves relative to the support into and out of said mold section. The pellet boat includes one or more pellet pots which are adapted to receive and hold a solid pellet of material. The loader has a release mechanism which is movable between a blocking position and a release position. The release mechanism retains the pellets in the pellet pots in the blocking position and releases the pellets from the pots when manipulated to the release position for dropping the pellets into a mold of the machine's mold section.

11 Claims, 4 Drawing Sheets

MANUAL PELLET LOADER FOR BOSCHMAN AUTOMOLDS

TECHNICAL FIELD OF THE INVENTION

The present invention relates generally to encapsulating electronic elements in a plastic material, and in particular the present invention relates to an apparatus and method for bypassing the molding machine automatic delivery system.

BACKGROUND OF THE INVENTION

The Boschman automold machine is utilized to encapsulate electronic components such as integrated circuits in a plastic material. Circuit dies are fabricated or die cut from wafer material and then added to a substrate material forming a circuit sub-assembly. The circuit sub-assemblies are run through the Boschman machine to encapsulate the parts in plastic to protect the circuits dies and leads or wire bonds from damage.

The Boschman machine operates in a manner where the circuit sub-assemblies are automatically fed into the mold section of the machine with one sub-assembly disposed in each mold cavity. Plastic material is then injected through a sprue into the mold cavities to encapsulate the subassemblies. The encapsulated components are then automatically ejected or unloaded from the machine. The plastic material is initially provided in the form of a pill or pellet and may consist of any number of materials such as a thermoset resin or a melamine compound or the like. The pellets are automatically transported by a pellet boat which individually delivers a pellet to a pot adjacent each mold cavity. The mold section is heated to liquefy the pellets prior to injection of the plastic material into the mold cavities.

The mold cavities and material transport passages of the automold machine must be cleaned periodically to remove excess material and contaminants. The automold machine runs on a continuous cycle or process.

One method of cleaning requires the machine to be shut down long enough for a technician to remove the mold from the machine, replace the mold with a spare, and restart the machine. This process requires significant down time for the machine, which is on the order of 60 minutes for each cleaning cycle. This method requires having a spare mold, which is an added expense. Further, the removed mold must also be cleaned, adding time to the cleaning cycle.

An additional method of cleaning may be performed by running cleaning pellets directly through the machine through the production process path. One problem with this method is that the cleaning pellets are often of a different size than the plastic material pellets. To run a continuous line, the system can only handle one size pellet and therefore the machine must be shut down to convert the system to accept the odd size cleaning pellets. Another problem with this method is that the machine must be completely evacuated of process pellets before loading the cleaning tablets or pellets into the automatic feed system to avoid mixing of materials. The cleaning pellets leave a residue throughout the process path and handling system if run through the machine in this manner. One or more cleaning pellets may even be left in the system when converted over to the process pellets. This causes cleaning material to mix with the plastic material contaminating any parts encapsulated with the mixed materials. The procedure necessary to ready the mold for the cleaning process and production processes are different. If the set-up for the production process is not done perfectly after the cleaning process is complete, the mold must be re-conditioned causing further downtime of the automold machine.

An additional problem with the present machine is that it is difficult and time consuming to do a test or experimental run for materials other than the production pellet material. This is because, again, the machine must be shut down and evacuated of all production pellet material prior to performing the test. Once a test is completed, the machine must again be shut down for conversion back to production material. Because the machine must be shut down, it would be very time inefficient and therefore undesireable to attempt to run a low volume test, such as a single shot test.

For the reasons stated above, and for other reasons stated below which will become apparent to those skilled in the art upon reading and understanding the present specification, there is a need in the art for an improved apparatus for and method of cleaning a Boschman automold machine which results in a more reliable production mold process, requires less machine downtime, and is easier to perform than conventional known methods.

SUMMARY OF THE INVENTION

The above-mentioned problems with present automold technology and other problems are addressed by the present invention and which will be understood by reading and studying the following specification. An apparatus and method of bypassing the automatic feeding system of a Boschman automold machine is described which is useful in the process of encapsulating electronic components and the like with a plastic material which results in a more reliable product while taking less time to perform.

In particular, one embodiment of the present invention describes a manual loader for use in bypassing the automatic pellet feeder of the machine used to encapsulate integrated circuit assemblies in plastic. The loader has a support mounted adjacent the mold section of the machine. The loader also has at least one pellet boat which moves relative to the support into and out of said mold section. The pellet boat includes one or more pellet pots which are adapted to receive and hold a solid pellet of material.

The loader also has a release mechanism which is movable between a blocking position and a release position. The release mechanism retains the pellets in the pellet pots in the blocking position and releases the pellets from the pots when manipulated to the release position for dropping the pellets into a mold of the machine's mold section.

The manual loader may be used to bypass the automatic feeder system to permit cleaning and experimental testing of mold compounds without requiring a total evacuation of production pellet materials from the feeder system. An operator need only momentarily stop the machine's feeder, load cleaning or test pellets into the pellet boat, maneuver the boat into the mold section of the machine, release the pellets into the mold, and remove the boat from the mold section. The operator then need only run the mold through a single cycle to either clean the molds or to produce a single shot of experimental integrated circuit assemblies.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and the scope of the present inventions is defined only by the appended claims.

Figure 1:
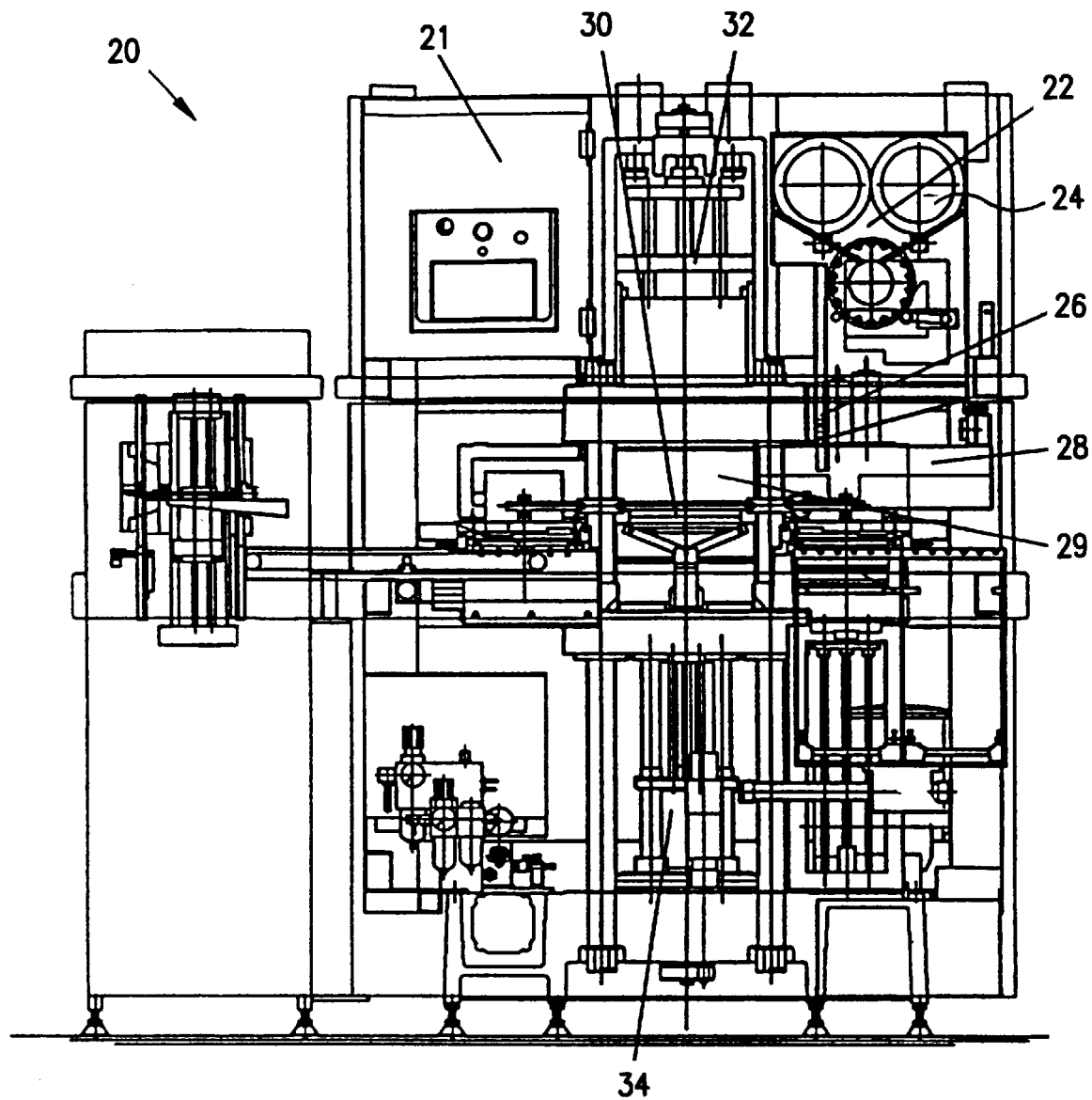
FIG. 1 is a front view of a conventional Boschman automold machine where the front cover panels have been removed to view the internal components of the machine.

Referring now to the drawings, FIG. 1 illustrates a Boschman automold machine 20 used to encapsulate integrated circuit assemblies with a plastic material as is known in the art. Machine 20 is illustrated in FIG. 1 with the front covers taken off to illustrate the general internal components and sections of the machine. Machine 20 includes a control unit 21 for programming and setting up the machine to control the various steps of the encapsulation process. The control unit 21 may be programmed to accommodate many different applications. The machine also includes a feeder system 22 having a pellet supply 24 for holding a plurality of material pellets therein to be used during the process. Below the pellet supply is a pellet separator 26 for separating out each individual material pellet for delivery to a pellet transport 28. The individual material pellets are fed through the above-described automatic feeder system 22 to the mold section 29 of the machine where a single individual pellet is delivered to each pellet pot as will be described herein.

Figure 3:
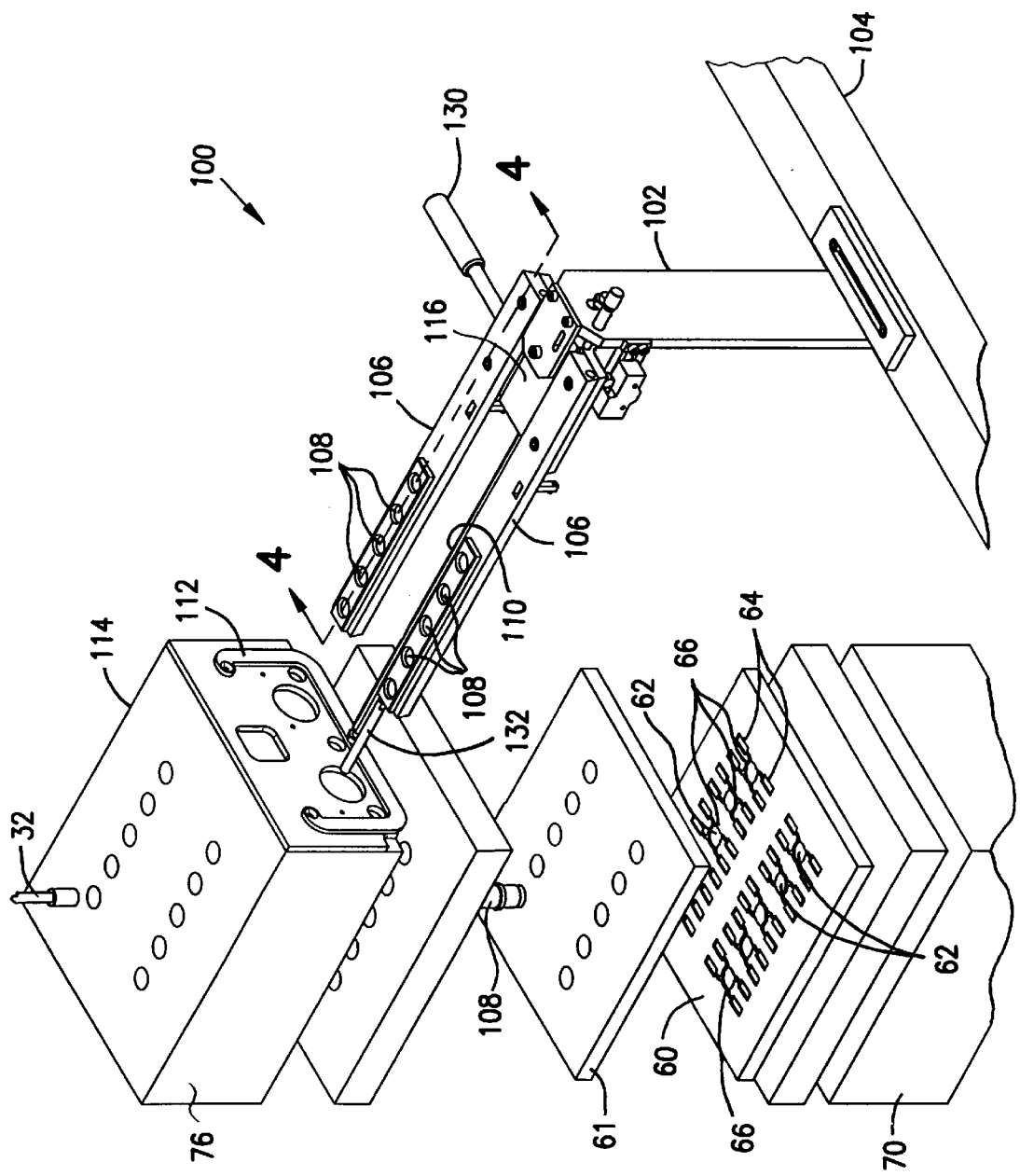
FIG. 3 is an exploded perspective view of an upper and a lower mold section of the machine of FIG. 1 shown with a manual bypass loader constructed in accordance with one embodiment of the invention.

A mold drive system 34 is driven to bring the two halves of a mold 30 together to encapsulate the integrated circuits held therein. A plunger 32 is driven into mold 30 to transfer material from a pellet pot through sprues (not shown) and in to the individual cavities (FIG. 3). The machine 20 will not be described in any greater detail herein as the machine is well known in the art and the basic process of encapsulating integrated circuits by use of the machine is also known in the art. The invention is directed to a method and apparatus for circumventing or bypassing the automatic feeder system 22 for cleaning the mold section 29 and for easily performing experimental trial molds without having to empty out or clean the automatic feeder system.

Figure 2:
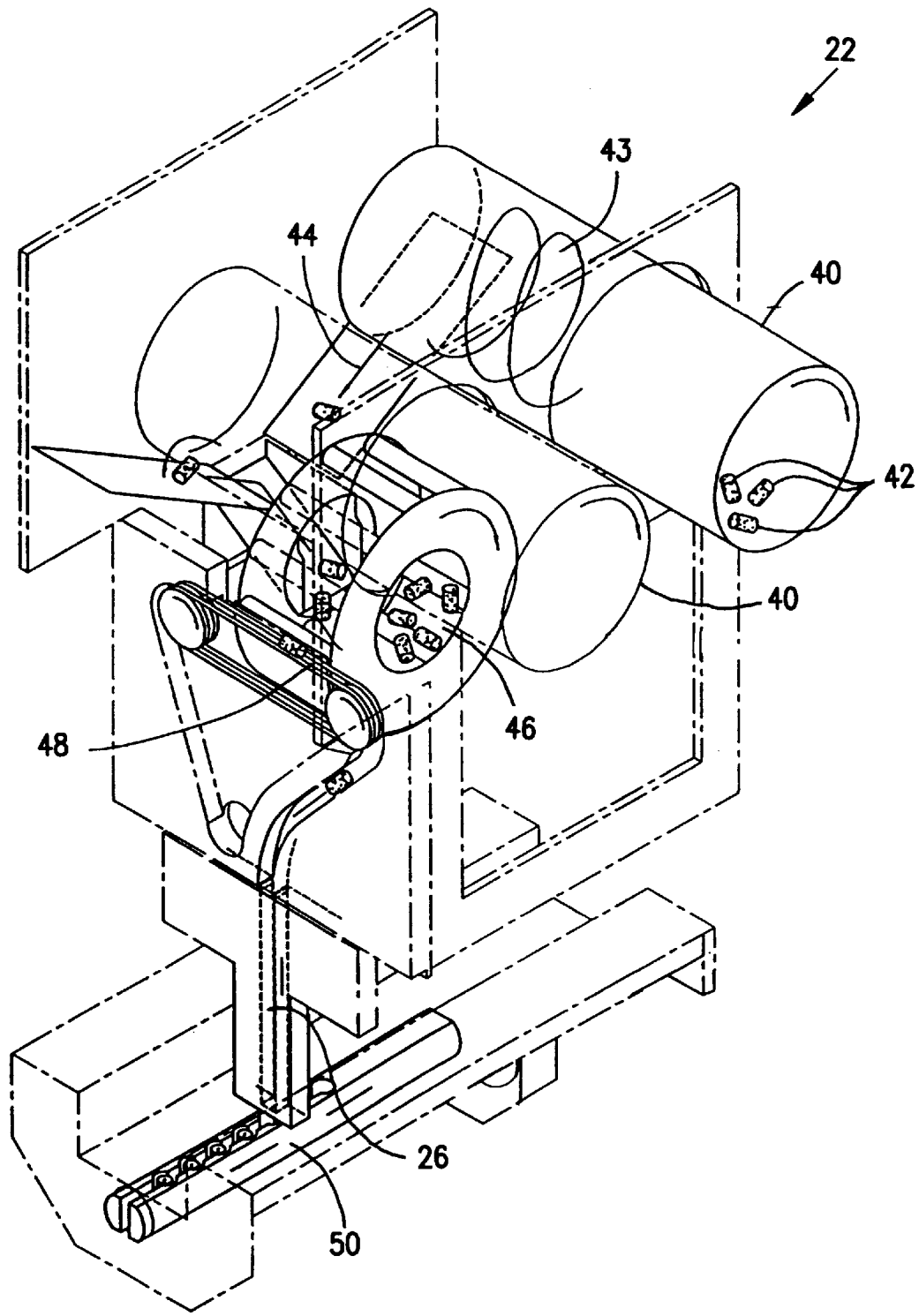
FIG. 2 is a perspective view of the automatic feeder system major components of the machine of FIG. 1.

Therefore, FIG. 2 illustrates the basic components of the automatic feeder system 22 in greater detail. Pellet supply 24 of the system typically includes a pair of containers 40 which are each filled with a plurality of material pellets 42 so that a continuous supply of pellets may be provided to the system. One container 40 may be removed from the system and refilled while the other one remains attached to the system to continuously supply material pellets. A spiral wall 43 urges pellets 42 within each container 40 toward one end so that they may be dropped down a chute 44 to a rotating cage 46 which separates and properly orients the material pellets 42 therein. The pellets 42 are transported by a small conveying system 48 to the pellet separator 26 where the pellets are individually dropped into a pellet boat 50. The pellet boat 50 transports the pellets to the mold section 29 of the machine for further processing steps.

A lower mold 60 and an upper mold 61 of the mold section is illustrated in FIG. 3. The exemplary lower mold 60 includes two parallel mold cavities therein, each having a plurality of spaced-apart pellet pots 62. A number of circuit cavities 64 are adjacent each pellet pot 62. An integrated circuit assembly (not shown) is held within each circuit cavity 64. The mold is heated so that the pellets within cavities 62 turn to liquid. The liquid is injected by the plunger 32 from the pellet pots 62 through the mold channels 66 to the circuit cavities 64. The mold 60 rests against a bottom heater block 70 for heating the lower mold 60. Similarly, the upper mold 61 having corresponding cavities and a corresponding heater block 76 would mate against lower mold 60 during the encapsulation process.

During standard operation, the pellet boat 50 is automatically manipulated into mold section 29 through upper heater block 76 and further manipulated to drop a material pellet 42 into each pellet cavity 62. The boat 50 is then automatically moved out of the mold section prior to the plunger 32 and mold drive system 34 dropping the upper half of the mold against lower mold 60.

A typical mold of the Boschman automold machine 20 must typically be cleaned about every 600 to 1,000 shots. A mold is typically cleaned off-line, requiring that each mold be removed from the machine and manually cleaned by one of several known processes using any one of many solvents or compounds. Each time a mold is cleaned, the machine must be shut down or paused while the mold is removed. The machine must either sit idle while the mold is cleaned and replaced or a spare mold must be pre-heated and installed and then the machine must be restarted while the primary mold is cleaned. Either way, the machine is down for a minimum of about sixty minutes to swap molds or longer to clean the only mold. In addition, a qualified technician is required to tear down the mold and then re-install the primary mold.

One problem with the present process is that to maximize the up time of the machine, two molds must be in existence, adding significant cost to a particular application. Also, the machine and the molds suffer wear and tear each time they are removed, cooled, cleaned, re-heated and replaced. Additionally, time and productivity are lost each time the machine is down for cleaning. Further, by constantly removing and replacing the molds, mold alignment is constantly being altered resulting in inconsistent or flawed component production.

An additional problem which exists with the present Boschman automold machine 20 is that it limits or inhibits experimental runs. It is often necessary to test new compounds for encapsulating integrated circuits, and to do so using the present machine is difficult, time consuming and may damage the machine or production run components after an experimentation run. This is because each time an experimental run is performed, the machine must be shut down, the feeder system and molds must be evacuated of all production pellet material, and then the feeder system must be filled with the experimental compound.

After an experimental run is performed, the machine must again be down to be evacuated of any experimental compound. Significant time is lost when undergoing such a procedure. Also, if the machine is not completely cleared out before and after the experimental run, a mix of materials or compounds may result, either negating the results of an experimental test or producing flawed or damaged production components. Additionally, because of the time it takes to change the machine over, it is inefficient to run a short, very low volume experimental run. It is desirable that there be a means to bypass the automatic feeder system which would permit an experimental run of even a single mold shot.

It is an object of the present invention to provide a manual loader which bypasses the machine's automatic feeding system, permitting the molds to be cleaned while installed in the machine without causing significant production down time. It is also an object of the invention permit experimentation without having to clear out the feeder system of production materials or pellets.

FIG. 3 illustrates a manual bypass loader 100 constructed in accordance with one embodiment of the present invention. Loader 100 is intended to be mounted within mold section 29 of machine 20 adjacent mold 30 (see FIG. 1) so that it may be inserted into the mold section from the opposite side relative to the automatic pellet transport or pellet boat 50. Bypass loader 100 includes a support bracket 102 mounted to a fixed portion of machine 20 such as a cross member 104 within the mold.

Bypass loader 100 includes a pair of manual pellet boats 106 having a plurality of pellet pots or cavities 108 formed therein which are intended to correspond to pots or cavities 62 in the mold 30 as illustrated by lower mold 60. Bypass loader 100 also includes a splined shaft or raceway 110 mounted at one end to a rod mounting bracket 112 supported by an isolation plate 114 adjacent mold 30. The manual pellet boats 106 are carried on a connecting plate or carrier 116 at one end adjacent support bracket 102. Carrier 116 is adapted to be received and slidable along raceway 110 for moving the manual pellet boats into and out of mold section 29 of the machine as will be described herein.

Figure 4:
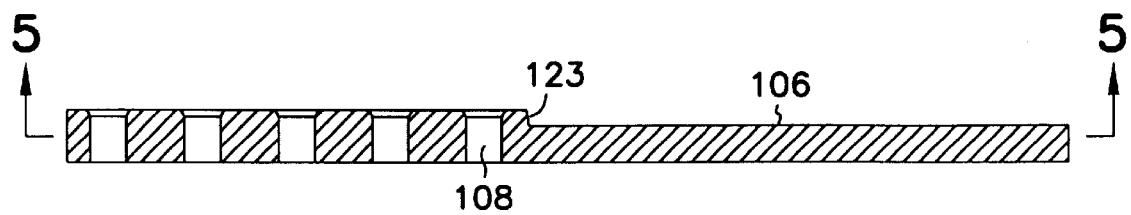
FIG. 4 is a side view in cross section taken along line 4—4 of FIG. 4 of the manual pellet boat.
Figure 5:
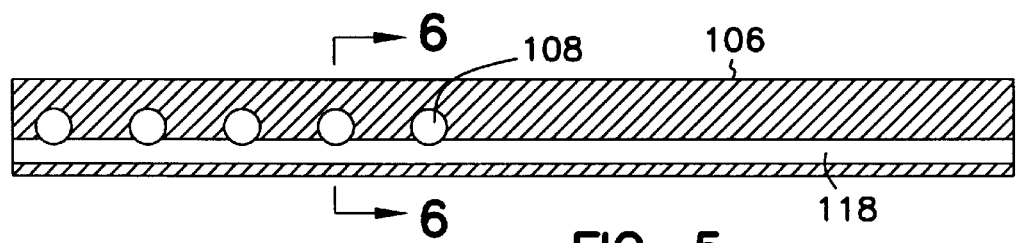
FIG. 5 is an end view in cross section taken along line 5—5 of FIG. 4 of the manual pellet boat.
Figure 6:
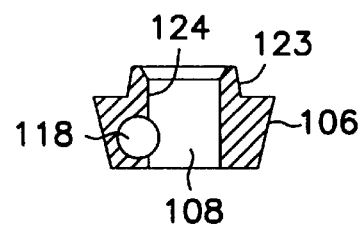
FIG. 6 is a top view in cross section taken along line 6—6 of FIG. 5 of the manual pellet boat.
Figure 7:
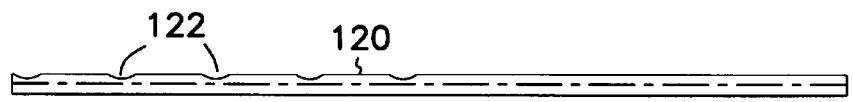
FIG. 7 is a top view of the release shaft in the release position within the pellet boats of the manual bypass loader of FIG. 3.

As illustrated in FIGS. 4 and 5, each pellet boat 106 comprises an elongate structure having a plurality of transverse through bores defining pellet pots 108 at one end and arranged longitudinally along the boat 106. As illustrated in FIG. 5, a longitudinal or axial shaft bore 118 is formed along each boat 106 slightly offset from the central axis of each pellet boat. The diameter of shaft bore 118 is intended to slightly impinge into each pellet pot 108. A release shaft 120 (shown in FIG. 7) is received in and extends along the shaft bore and includes a plurality of transverse grooves or clearance cutouts 122 which are each intended to correspond in contour and position with one of pellet pots 108.

When the release shaft 120 is in a release position, each clearance cutout 122 aligns with a corresponding pellet pot 108 to provide an unobstructed passage through pellet boat 106 via each pellet pot. This allows a material pellet 42 held within each pot to pass directly therethrough. The release shaft 120 may be manipulated by either rotational or longitudinal movement to a blocking position such that the clearance cutouts 122 do not correspond or align with pellet pots 108. In this condition, a portion of the diameter of release shaft 120 impedes or impinges upon the perimeter surface of pellet pots 108, thus obstructing passage of material pellets through the pots. If longitudinal movement of the shaft is to be used to block passage through the pots, the clearance cutouts may alternatively be annular rings or grooves formed around the outer diameter of shaft 120.

Each pellet boat 106 includes a raised section 123 corresponding to the end of shaft 120 including the pellet pots 108. The raised section provides a pellet nest 124 above the blocked portion of the pellet pot. Thus, a pellet 42 may be received in pellet pot 108 and retained within each pellet nest 124 when shaft 120 is in the blocking position as described above.

To operate bypass loader 100, each release shaft 120 must be in the blocking position prior to inserting material pellets 42 within the pellet pots 108. Once the material pellets are added, a user will manipulate a handle 130 to slide the bypass loader 100 forward along raceway 110 until all of the pellet pots 108 pass through isolation plate 114 into the mold section 29. A positive stop mechanism or an electronic sensing means such as detect rod 132 may be utilized to sense when bypass loader 100 is fully inserted into the mold section, ensuring that each pellet pot 108 are positioned directly over a corresponding mold cavity or pot 62 in the lower mold 60.

The release shafts 120 must be manipulated to the release position, permitting the material pellets 42 to pass through the pellet pots 108 and boats 106 into the mold cavities 62. The release shafts 120 are spring loaded, and are automatically released when the bypass loader 100 is fully inserted into the mold section. The operator then must manipulate handle 130 to slide the pellet boats back out of the mold section 29 to the rest position. The operator then may run the machine through a mold cycle. During the mold cycle, the lower mold closes and makes contact with the upper mold. Pellets 42 drop into the pots 108, and the plunger forces the melted pellets 42 into the channels 66 to the circuit cavities 64.

The bypass loader 100 of the invention provides two very important aspects not provided by the existing automatic feeder system 22 of the Boschman automold machine 20. The manual bypass loader 100 permits the machine and its molds 30 to be cleaned without removing the molds from the mold section. Further, this may be done without completely evacuating the automatic feeder system of any production process material pellets. Also, experimental or test runs may be performed using different pellet material compounds for as little as one mold shot. Each test cycle may also include as few as one test pellet or as many material pellets 42 as can be held in the manual pellet boats 106. This again may be done without the necessity of completely evacuating the automatic feeder system of other pellet material compounds. Successive test runs may also be run where each run includes a different material compound.

To clean the molds utilizing the manual bypass loader of the present invention, an operator need only insert cleaning pellets into pellet pots 108 of the pellet boats 106 prior to moving the bypass loader forward into the molds 30 of the machine 20. The cleaning pellets are then dropped into the pellet pots 108 of the upper mold 61. This allows the cleaning material of the pellets to be heated and injected through channel 66 and to the mold cavity 64 to clean them. The cleaning material is then removed from the mold cavity 64, which can occur either manually or automatically. However, since the cleaning material tends to be more fragile, the cleaning material is preferably removed by hand.

To run an experimental test, the automatic feeding system is simply shut off and experimental material pellets are inserted into pellet pots 108 of manual pellet boats 106 and then inserted into the pellet cavities 62 in lower mold 60 as described above. The experimental material will then be heated by the molds, allowing it to flow into circuit cavity 64 to encapsulate integrated circuit assemblies with the experimental compound. The operator then cycles the machine to eject them from the circuit mold cavities and removes them from the machine in a conventional manner. During experiment or cleaning cycles, lead strips without dies are used in the machine 20 for encapsulation, and then are later discarded. To proceed with a production run from either a cleaning or an experimental cycle, the automatic feeding system may simply be turned back on, permitting the production material compound pellets to drop one by one into the production automatic pellet boat feeders 50.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. An apparatus for use in bypassing an automatic feeder system of a machine having a mold section for encapsulating electronic components, said apparatus comprising:

a support adapted to mount said apparatus to said machine;

at least one pellet boat movable relative to said support into and out of said mold section of said machine, said pellet boat having a plurality of pellet pots for retaining and releasing material pellets;

a release mechanism associated with said pellet boat having an elongate release shaft received in an elongate bore formed longitudinally along said pellet boat, said release shaft having a plurality of cutouts formed on its outer diameter so that one of said cutouts corresponds with each one of said plurality of pellet pots, said release mechanism being movable between a blocking position and a release position; and wherein said release mechanism retains said material pellets in said pellet boat when in said blocking position and releases said material pellets from said pellet boat when in said release position.

2. The apparatus of claim 1 wherein said plurality of pellet pots each are a bore formed through said pellet boat.

3. The apparatus of claim 2, wherein said bores each formed transversely through said pellet boat.

4. An apparatus for use in bypassing an automatic feeder system of a machine having a mold section for encapsulating electronic components, said apparatus comprising:

a support adapted to mount said apparatus to said machine:

at least one pellet boat movable relative to said support into and out of said mold section of said machine, said pellet boat for retaining and releasing material pellets;

a release mechanism associated with said pellet boat, said release mechanism being movable between a blocking position and a release position;

wherein said release mechanism retains said material pellets in said pellet boat when in said blocking position and releases said material pellets from said pellet boat when in said release position wherein each of said at least one pellet boat further comprises a plurality of pellet pots adapted for receiving a material pellet therein and releasing a material pellet therefrom; and wherein said release mechanism comprises an elongate release shaft received in an elongate bore formed longitudinally along said pellet boat, said release shaft having a plurality of cutouts formed on its outer diameter so that one of said cutouts corresponds with each one of said plurality of pellet pots.

5. The apparatus of claim 4 wherein each one of said plurality of cutouts aligns with one of said plurality of pellet pots to permit unobstructed passage through said pellet pots of said material pellets when said release shaft is in said release position.

6. The apparatus of claim 4 wherein said cutouts do not align with said pellet pots and said outer diameter of said release shaft impinges into said pellet pots to obstruct passage therethrough of said material pellets when said release shaft is in said blocking position.

7. The apparatus of claim 1, wherein the release mechanism is automatically placed in the release position upon insertion of the pellet boat in to the mold section.

8. The apparatus of claim 1 further comprising a pair of said pellet boats.

9. The apparatus of claim 8 further comprising a carrier supporting said pellet boats, wherein said carrier is slidable relative to said support.

10. The apparatus of claim 1 further comprising a splined raceway affixed to said support, said carrier being slidably received on said raceway such that said pellet boat is movable into and out of said mold section.

11. The apparatus of claim 10 further comprising a handle for manually moving said carrier along said raceway.

\* \* \* \* \*